US012454729B2

(12) United States Patent
Turchi et al.

(10) Patent No.: US 12,454,729 B2
(45) Date of Patent: Oct. 28, 2025

(54) NATURAL LEATHER TRIMMING MACHINE AND NATURAL LEATHER CONDITIONING PLANT

(71) Applicants: Maximilian Turchi, Prato (IT); Alessio Idoli, Pistoia (IT)

(72) Inventors: Maximilian Turchi, Prato (IT); Alessio Idoli, Pistoia (IT)

( * ) Notice: Subject to any disclaimer, the term of this patent is extended or adjusted under 35 U.S.C. 154(b) by 0 days.

(21) Appl. No.: 18/576,643

(22) PCT Filed: Jul. 7, 2022

(86) PCT No.: PCT/IB2022/056291
§ 371 (c)(1),
(2) Date: Jan. 4, 2024

(87) PCT Pub. No.: WO2023/281442
PCT Pub. Date: Jan. 12, 2023

(65) Prior Publication Data

US 2025/0003018 A1 Jan. 2, 2025

(30) Foreign Application Priority Data

Jul. 9, 2021 (IT) ........................ 102021000018161

(51) Int. Cl.
*C14B 5/00* (2006.01)
*C14B 1/34* (2006.01)
(Continued)

(52) U.S. Cl.
CPC .................. *C14B 5/00* (2013.01); *C14B 1/34* (2013.01); *C14B 17/005* (2013.01); *C14B 17/06* (2013.01);
(Continued)

(58) Field of Classification Search
CPC ........... C14B 5/00; C14B 1/34; C14B 17/005; C14B 17/06; C14B 2700/11; C14B 2700/12; C14B 2700/14; B26D 5/007
See application file for complete search history.

(56) References Cited

U.S. PATENT DOCUMENTS 3,851,414 A * 12/1974 Miculka .................... C14B 1/44 38/49
4,875,254 A * 10/1989 Rudy ..................... B23Q 17/24 83/365
5,089,971 A * 2/1992 Gerber ..................... B26D 5/32 700/134

FOREIGN PATENT DOCUMENTS

CN 1986835 B * 8/2011 ............... C14B 5/00
CN 205603610 U 9/2016
(Continued)

OTHER PUBLICATIONS

Translation CN 1986835.*
(Continued)

*Primary Examiner* — Shaun R Hurley
(74) *Attorney, Agent, or Firm* — SHUTTLEWORTH & INGERSOLL, PLC; Timothy J. Klima

(57) ABSTRACT

Described is a natural leather trimming machine including: an ironing device for stretching and removing creases and wrinkles from the leather, cutting means for cutting the leather along at least one cutting line, a detection unit configured to detect the position of the leather, the shape of at least one relative end edge, and the position of any defects close to at least one relative end edge, a plurality of conveyor belts and a first command and control unit configured to determine the cutting coordinates of the leather.

14 Claims, 2 Drawing Sheets

(51) Int. Cl.
*C14B 17/00* (2006.01)
*C14B 17/06* (2006.01)

(52) U.S. Cl.
CPC ....... *C14B 2700/11* (2013.01); *C14B 2700/12* (2013.01); *C14B 2700/14* (2013.01)

(56) References Cited

FOREIGN PATENT DOCUMENTS

| | | | |
|---|---|---|---|
| CN | 209292370 | U | 8/2019 |
| CN | 110793973 | A | 2/2020 |
| EP | 3699306 | A1 | 8/2020 |

OTHER PUBLICATIONS

Italian Search Report dated Apr. 5, 2022 from counterpart Italian App No. IT 202100018161.
International Search Report dated Oct. 21, 2022 from counterpart PCT App No. PCT/IB2022/056291.

* cited by examiner

NATURAL LEATHER TRIMMING MACHINE AND NATURAL LEATHER CONDITIONING PLANT

This application is the National Phase of International Application PCT/IB2022/056291 filed Jul. 7, 2022 which designated the U.S.

This application claims priority to Italian Patent Application No. 102021000018161 filed Jul. 9, 2021, which application is incorporated by reference herein.

TECHNICAL FIELD

This invention relates to a natural leather trimming machine.

The invention also relates to a natural leather conditioning plant.

BACKGROUND ART

Natural leather means a leather removed from an animal and subjected to a tanning process.

The natural leather thus obtained is a by-product to be used for subsequent processing, for example, of the textile type.

Natural leather has a surface of flexible material, with a jagged edges, approximately weighing approximately 15 kg and with a length of approximately 3.5 m.

The jagged edges of the leather are due partly to the shape of the animal—which has legs, muzzle, tail, ears, etc.—and partly to the shaking action necessary to detach the skin from the carcass of the animal.

Moreover, the natural leather, even after processing in a shaving machine—which is designed is to render uniform the thickness of the leather—may have zones not processed correctly and therefore with variable thicknesses, with the result that the leather obtained does not have uniform mechanical or softness characteristics.

Such zones concentrate, for example, in the part of the leather around the legs of the animal, which represents the zone in which the shaving machine is usually unable to intervene correctly, and in which the thickness of the skin is usually greater than that required.

Moreover, the leather at the outfeed from the shaving machine may have further problems, that is to say, zones with very small thicknesses, which can adversely affect the resistance of the leather.

Further defects of the leather may be, for example, the rough edges and the notches.

These defects are currently eliminated from the leather manually, with the intervention of skilled personnel, who with suitable cutters remove the defective material close to the edge of the leather.

However, this solution not only results in very lengthy processing times, and high costs, but above all, does not allow a spot check of the leather to be performed.

To give an example, two leathers are usually trimmed per minute with the prior art solutions.

Moreover, the prior art solutions either leave part of the defects present in the leather, or, where it is not possible to correctly identify the defect present in the natural leather, areas of leather which are potentially not defective are removed, producing an excess of processing waste which contributes to increasing the processing costs.

Moreover, in the case of processing in a continuous plant, which involves the passage of leather from the shaving machine to the trimming zone, the process undergoes continuous stoppages, since the shaving machine has a work cycle which is usually faster, compared with the time required for verifying and trimming the edges of the leather by the operators in the trimming zone.

AIM OF THE INVENTION

The aim of the invention is therefore to provide a machine for trimming natural leather and a plant for conditioning natural leather which are able to overcome the above-mentioned drawbacks of the prior art.

A further aim of the invention is to provide a machine for trimming natural leather and a plant for conditioning natural leather which are at the same time practical to use.

According to the invention, these aims and others are achieved by a natural leather trimming machine and a natural leather conditioning plant having the technical features described in the appended claims.

BRIEF DESCRIPTION OF THE DRAWINGS

The technical features of the invention, with reference to the above-mentioned aims, are clearly described in the appended claims and its advantages are apparent from the detailed description which follows, with reference to the accompanying drawings which illustrate purely non-limiting example embodiments of the invention, in which:

Figure 1:
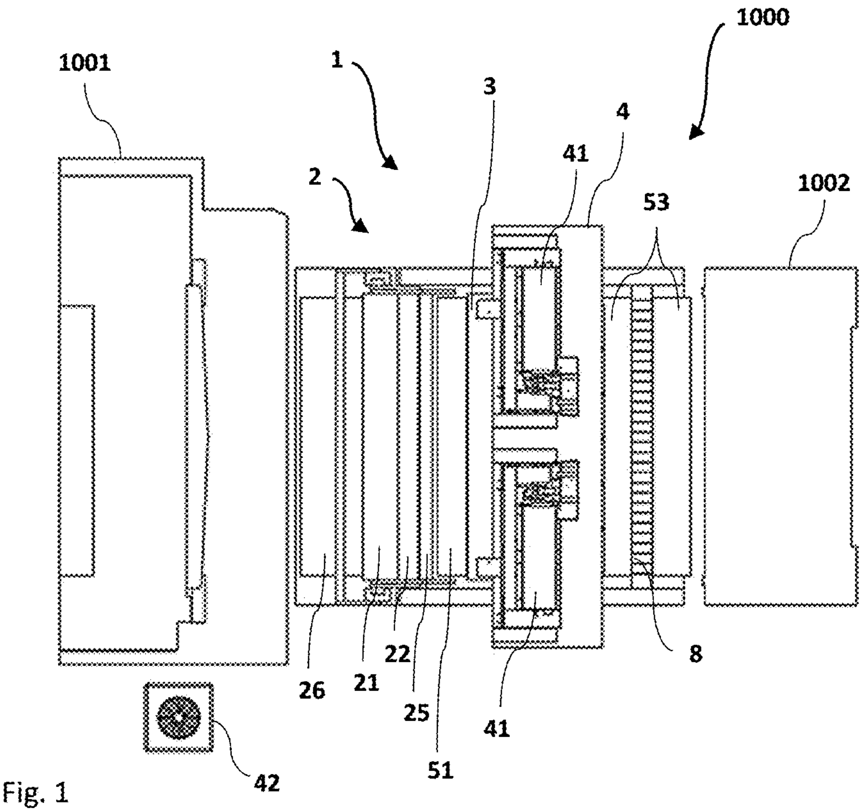
FIG. 1 is a schematic top view of an embodiment of the natural leather conditioning plant according to the invention.

With reference to the accompanying drawings, the numeral 1 denotes in its entirety a natural leather trimming machine P made in accordance with the invention, hereinafter also referred to simply as the machine 1.

DETAILED DESCRIPTION

With reference to the accompanying drawings, the machine 1 comprises an ironing device 2, a detection unit 3, cutting means 4, a plurality of conveyor belts 51, 52, 53 and a first command and control unit, not illustrated.

More specifically, the ironing device 2 is configured to stretch and remove creases and wrinkles from the natural leather P.

For this purpose, the ironing device 2 comprises at least one pair of rollers 21, 22 facing each other.

The natural leather P passing in the middle, between the roller 21 and the roller 22 retains the natural leather P, producing the stretching of the leather P.

Advantageously, the rollers 21 and 22 are motor-driven for rotating about themselves with respect to a respective longitudinal axis, to facilitate the ironing of the leather and the transport of the natural leather P towards the detection unit 3 and the cutting means 4.

With reference to the accompanying drawings, the rollers 21, 22 are movable along the direction of extension from the machine 1 for feeding/withdrawing the natural leather P towards/from the detection unit 3.

That is to say, the rollers 21 and 22 translate along a direction of moving towards/away from the detection unit 3.

This movement avoids the overlapping of the natural leather P during processing.

In effect, by modulating the moving towards/away from the detection unit 3 the natural leather P is allowed to remain in a perfectly ironed position, that is to say, without creases or end edges raised relative to a conveying surface.

The ironing device 2 also comprises a first movable arm 23 configured for lifting/lowering, according to a ground plane, the natural leather P entering the pair of rollers 21, 22.

In that way it is possible to stretch or stress the natural leather P to facilitate the sliding of the leather P towards the detection unit 3, to prevent the formation of creases or wrinkles.

Figure 2:
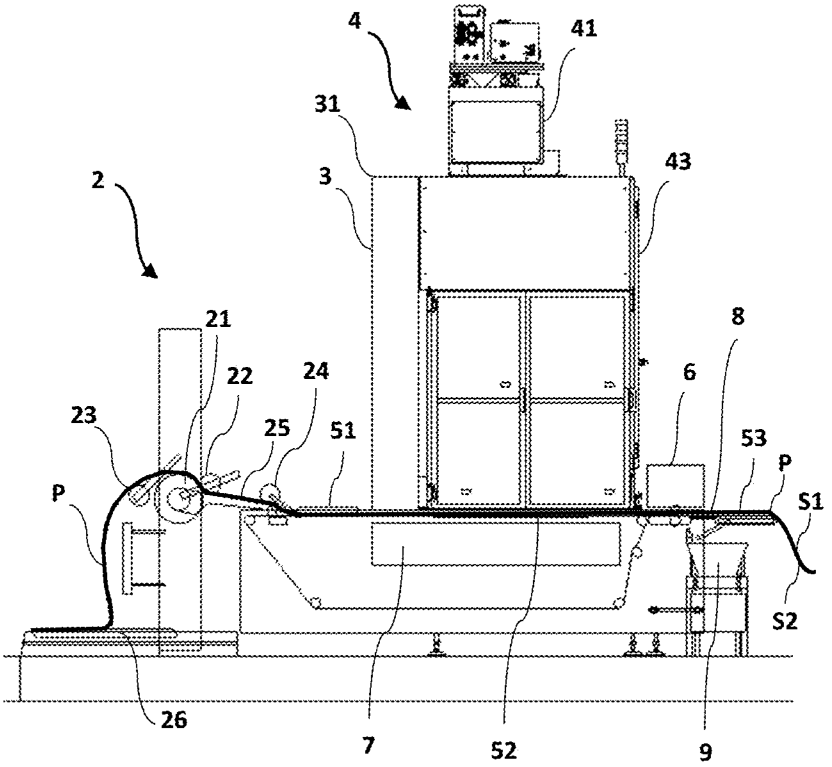
FIG. 2 is a schematic front elevation view of the natural leather trimming machine according to the invention.

With reference to FIG. 2, the ironing device 2 comprises a second movable arm 24 configured for lifting/lowering, according to a ground plane, for applying a pressure on the natural leather P coming out from the pair of rollers 21 and 22, and preventing the formation of creases or wrinkles and stretching any present.

Advantageously, the ironing device 2 comprises a first conveyor 25 interposed between the pair of rollers 21 and 22 and the second movable arm 24, for keeping the natural leather P taut as it advances towards the detection unit 3.

Advantageously, the first arm 23 and the second arm 24 and the first conveyor 25 are motor-driven.

Still more advantageously, each of them has an independent drive unit, for modulating the speed of feeding the natural leather P and allowing the leather P to be kept stretched—without creases, wrinkles or raised end edges—from the infeed into the machine 1 to the detection unit 3.

Advantageously, the pair of rollers 21 and 22, the first 23 and the second 24 arm, and the first conveyor 25 allow the curvature of the natural leather P to be modified several times—from concave to convex and vice versa—as it advances towards the detection unit 3, in such a way as to stretch the natural leather P several times.

With reference to FIG. 2, the ironing device 2 comprises a second conveyor 26 for feeding the natural leather P towards the cutting means 4.

The second conveyor 26 is positioned below the pair of rollers 21 and 22, and is configured to reduce the friction of the natural leather P with the ground surface.

This prevents further creases or wrinkles from forming during the feeding of the natural leather P towards the detection unit 3.

The detection unit 3 is located at the entrance of the natural leather P to the cutting means 4.

More specifically, the detection unit 3 detects the position of the natural leather P, the shape of at least one end edge B of the natural leather P, and the position of any defects D of the natural leather P close to at least one relative end edge B.

The detection unit 3 comprises at least one video camera, not illustrated.

Advantageously, there are between 2 and 4 video cameras.

A greater number of video cameras makes it possible to detect a surface greater of the natural leather P, rather than an area around the end edge of the natural leather P.

In this way it is possible to increase the surface of natural leather P which is monitored.

At least one video camera is one selected between a linear video camera, a matrix type video camera or a combination thereof.

Advantageously, the matrix type video cameras allow a more precise detection of the position of the natural leather P and its edges or defects, generating a grid of coordinates to be used as a reference base for the subsequent cutting of the natural leather P.

Linear video cameras are preferred for processing in which, for example, leather with large dimensions or of less value is used, that is to say, in which the cutting precision is not essential.

Advantageously, the detection unit 3 comprises one or more light sources for illuminating the natural leather P and precisely detecting the position of the natural leather P, a relative end edge B and any defects in the proximity of the edge B.

According to some embodiments, not illustrated, the detection unit 3 comprises a first light source for illuminating a first surface S1 of the natural leather P.

According to other embodiments not illustrated, not illustrated, the detection unit 3 also comprises a second light source for illuminating a second surface S2 of the natural leather P, wherein the first S1 and the second S2 surface are opposite to each other.

When the detection unit 3 comprises a first and a second lighting source located on opposite sides of the natural leather P, detection of the thickness of the leather P is allowed close to at least one relative end edge B.

This configuration, the so-called "back light" configuration, allows the natural leather P to be illuminated once from above (surface S1) and once from below (that is, with backlighting, surface S2), to determine the luminous intensity and consequently obtain the thickness of the leather P at a predetermined coordinate.

According to embodiments not illustrated, the detection unit 3 is in the form of a scanner.

The detection unit 3 comprises a body 31 for isolating the video cameras and the light sources from the ambient lighting, which could adversely affect the detection of the coordinates of the position of the natural leather P, a relative edge B and any defects D.

According to embodiments not illustrated, close to the detection unit 3 there is a sensor designed to activate the automatic recognition of the natural leather P for starting the detection of the position, an end edge B and any defects D of the natural leather P.

The cutting means 4 are located downstream of the ironing device 2 and are configured to cut the natural leather P along at least one cutting line L, defined in more detail below.

According to a preferred embodiment, the cutting means 4 comprise at least one laser source 41.

With reference to the accompanying drawings, the cutting means 4 comprise two laser sources 41 to make the cutting of the natural leather P faster.

The laser source 41 produces a laser beam which acts on the natural leather P causing the cut.

The cutting means 4 comprise a second command and control unit 42 described in more detail below.

With reference to the accompanying drawings, the laser source 41 is connected in a fixed position of the machine 1.

According to this configuration, the cutting means 4 comprise movable galvanometric mirrors, not illustrated, configured to direct the laser source 41 and make the cut while the laser source 41 remains fixed.

According to other embodiments not illustrated, the laser source 41 is movable, that is to say, it acts like a mobile plotter.

The second command and control unit 42 acts on the cutting means 4 and is configured to direct at least one between the laser source 41 and the galvanometric mirrors.

Advantageously, the laser sources 41 are inserted in a shielding container 43 in order to operate safely.

The laser sources 41 must be contained inside the shielding container 43 in order to prevent any, harmful, escape of the laser beams.

According to embodiments not illustrated, at least one of either the detection unit 3 or the cutting means 4 comprise at least one of either a suction device or a blower, or a combination of them, for keeping the natural leather P in a stretched position at the detection unit 3 and/or at the cutting means 4, respectively.

The term "stretched position" means the natural leather P without creases or end edges raised with respect to a conveying surface.

By operating a suction, or vice versa by blowing an air jet on at least one surface of the natural leather P, the stretching of the leather P is facilitated, in such a way that it is arranged according to a single plane.

Advantageously, the cutting means 4 comprise fume suction devices, not illustrated, for extracting the fumes generated by the laser cutting, and operating safely.

The machine 1 also comprises a plurality of conveyor belts 51, 52, 53 configured to feed the natural leather P from the ironing device 2 to the detection unit 3 (belt 51), present (band 52) and then move away (belt 53) the natural leather P from the cutting means 4.

More specifically, the conveyor belt 51 makes it possible to send and present the natural leather P to the detection unit 3.

For this reason, the conveyor belt 51 pushes the natural leather P under the detection unit 3.

The conveyor belt 51 extends for a length equal to the distance between the outlet point of the natural leather P from the ironing device 2 to the point of entry of the natural leather P into the detection unit 3.

In that way, at the detection unit 3 there is no conveyor belt, and the natural leather P is taut and suspended, so that detection by the detection unit 3 can be performed on the first S1 and second S2 surface of the natural leather P, without the interposing of conveyor belts.

Advantageously, the conveyor belt 51 has a spiralling which extends from the centre towards its ends to further stretch and keep the natural leather P stretched.

According to embodiments not illustrated, the spiralling has an adhesive surface, to increase the tensioning effect of the natural leather P.

The conveyor belt 52 configured to present the natural leather P to the cutting means 4 has a conveying surface made with a metal mesh.

This prevents the laser source 41 from rebounding on the natural leather P, which would occur if the conveying surface of the conveyor belt 52 had a continuous surface.

Moreover, the use of the metal mesh prevents signs from being left on the leather, in such a way as to guarantee a high standard of quality of the processing.

Advantageously, the metal mesh is made of stainless steel, which is a material which best meets the requirements of the invention and the interaction with the laser.

The machine 1 comprises a dust collection drawer 7, located under the conveyor belt 52, for collecting any processing waste from the cutting means 4.

The conveyor belt 53 allows the natural leather P to be moved away from the cutting means 4.

Advantageously, the conveyor belt 53 is made of two or more conveying surfaces separated by a rack 8 in order to separate the natural leather P from the processing waste.

The machine 1 comprises a first command and control unit, not illustrated, configured to determine the coordinates for cutting the natural leather P on the basis of the position of the natural leather P, the shape of at least one relative end edge B, and the position of any of its defects D.

Figure 3:
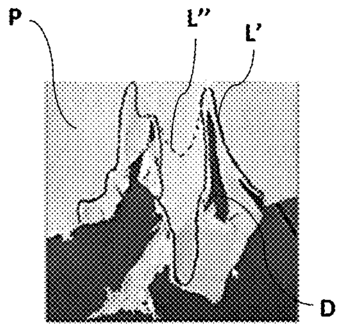
FIGS. 3 and 4 are schematic perspective views of a portion of natural leather and some reference details according to the invention.
Figure 4:
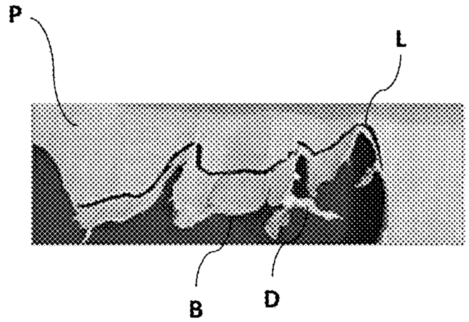

The cutting coordinates define at least one cutting line L close to at least one end edge B of the natural leather P, as illustrated in FIGS. 3 and 4.

The second command and control unit 42 (of the cutting means 4) is also configured to communicate with at least one between the detection unit 3 and the first control unit.

The second command and control unit 42 comprises a display for controlling and, if necessary, acting on the cutting means 4.

The second command and control unit 42 also makes it possible to control the emergency systems (CIL) for cooling the laser sources 41, and the fume extraction devices.

The machine 1 also comprises a hopper 9 for collecting the processing waste at the outfeed of the cutting means 4, as illustrated in FIG. 2.

The hopper 9 is positioned at the rack 8.

According to embodiments not illustrated, the machine 1 comprises a processing waste shredder or compactor.

With reference to FIG. 2, the machine 1 comprises a thickness verification unit 6 located at the exit from the cutting means 4 to measure the thickness of the natural leather P close to at least one relative end edge B.

Advantageously, the thickness verification unit 6 comprises a plurality of rollers, not illustrated, which move vertically with respect to a ground plane, for automatically detecting the thickness of the natural leather P as it feeds out of the cutting means 4.

The verification unit 6 makes it possible to measure the thickness with a precision of approximately $\frac{1}{10}$ mm, that is to say, comparable to a gauge.

The use and operation of the machine 1 according to the invention comprises the following steps.

A first step wherein the natural leather P is ironed to stretch and eliminate creases and wrinkles, whilst the natural leather P advances towards the detection unit 3.

Subsequently, thanks to the detection unit 3, the position of the natural leather P, the shape of at least one end edge B thereof, and the position of any defects D of the natural leather P close to at least one relative end edge B are detected.

Subsequently, or simultaneously with the detection step, the natural leather P cutting coordinates, the shape of at least one relative end edge B, and the position of any defects D close to the end edge B are determined on the basis of the position of the natural leather P.

In that way, at least one cutting line L is defined close to at least one end edge B of the natural leather P, as well as the set of coordinates detected.

After, or simultaneously with the step of determining the coordinates, the natural leather P is cut along at least one cutting line L.

The residues obtained by the cutting step define processing waste of the natural leather P.

Advantageously, after the detection step, the natural leather P is fed at a constant speed to perform the cut.

According to different embodiments, after the detection step, the natural leather P is fed according to predetermined feed intervals, to make the cut, in such a way that the laser source 41 operates on the leather P stationary in a predetermined position.

Advantageously, after the step of detecting the position of any defects D of the natural leather P close to at least one end edge B, there is a step of identifying the defects D of the natural leather P.

The subsequent step of determining the cutting coordinates is therefore performed on the basis of the type of defects D detected.

The type of defects D is determined during the step of identifying the defects D.

In this way it is possible to define cutting "rules" on the basis of the type of defects D detected, in order to optimise the cutting and minimise the waste of natural leather P and the processing waste.

For example, a rule is that of softening the notches and cusps of natural leather P, which would otherwise be points of possible breakage of the leather during subsequent processing.

With reference to FIG. 4, the reference labels L' and L" denote two different possible cut lines.

Advantageously, after the step of cutting into natural leather P, there is a step of separating the natural leather P from the processing waste.

Moreover, after the step of cutting the natural leather P, there is a step of checking the thickness of the natural leather P.

With the machine according to this invention, a natural leather P processing cycle requires on average time of less than 40 seconds.

Another object of the invention is a plant 1000 for conditioning natural leather P, illustrated in FIG. 1.

The term "shaved leather" is used to mean natural leather which, after the tanning step, undergoes processing, for example with rotary blades, to bring the natural leather to the desired thickness.

Machines suitable for the purpose are defined as shaving machines 1001.

For example, the thicknesses of the natural leather exiting from the shaving machine 1001 are in the order of 1.5 mm.

The natural leather P conditioning plant 1000 according to the invention comprises a machine 1 and a shaving machine 1001 located upstream of the machine 1.

After shaving the shaved natural leather P passes into the trimming machine 1, that is to say, to identify and cut the portions of natural leather P which are unsuitable for the preset purposes of the processing.

The passage of the natural leather P between the shaving machine 1001 and the outfeed of the cutting means 4 of the machine 1 occurs in a time of less than 10 minutes.

In this way, the natural leather P remains perfectly stretched in a single plane, allowing the detection of the coordinates and the cutting of the natural leather P to be performed with a high level of precision.

Advantageously, the unit 6 for verifying the thickness of the natural leather P is configured for communicating retroactively with the shaving machine 1001 for automatically adjusting the shaving thickness of the natural leather P when the thickness of the natural leather P detected by the verification unit 6 is greater than or less than a predetermined threshold value.

In this way it is possible to act on the shaving machine 1001 to optimise the various steps for processing the natural leather P.

With reference to FIG. 1, the plant 1000 also comprises a folding machine 1002, located downstream of the machine 1, for folding the natural leather P and then packaging it.

In use, the natural leather P is inserted in the shaving machine 1001.

At the outfeed from the shaving machine 1001, the natural leather P is positioned on the pair of rollers 21 and 22, for being ironed and fed towards the detection unit 3.

The detection unit 3 detects the coordinates of the position of the natural leather P, its end edge B and any defects D, after which it is then fed towards the cutting means 4.

The cutting means 4 cut along at least one cutting line L defined on the basis of the coordinates detected by the detection unit 3.

After that, the natural leather P advances towards the outfeed of the cutting means 4, where the processing waste is separated from the trimmed leather P.

Subsequently, the natural leather P is accumulated in the folding machine 1002.

The natural leather trimming machine and the natural leather conditioning plant according to the invention achieve the preset aims and achieve important advantages.

A first advantage of the machine according to the invention is the possibility of obtaining natural leather with a uniform thickness across the entire surface of the leather.

Another advantage of the machine according to the invention is due to the possibility of identifying different types of defects of the natural leather, such as, for example, rough edges, notches, thicknesses not eliminated by the shaving machine, downy effect (with thicknesses <1.5 mm), etc. and modulating the cutting operation on the basis of the type of defect.

A further advantage is the possibility of speeding up the process for trimming natural leather and reducing processing waste, thereby optimising the processing of the leathers.

A further advantage is due to the fact that natural leather cutting errors are reduced and the processing precision is increased.

Another advantage of the plant according to the invention is due to the possibility of immediately checking the edge of the leather.

Yet another advantage of the machine and the plant is due to the possibility of reducing the production costs.

Yet another advantage of the plant according to the invention is due to the possibility of coordinating the processing of a shaving machine with a trimming machine to optimise the production of natural leather, thereby increasing the speed and reducing processing waste.

The invention claimed is:

1. A natural leather trimming machine comprising:

an ironing device for stretching and removing creases and wrinkles of said natural leather;

a cutting device arranged downstream of said ironing device, and configured to cut said natural leather along at least one cutting line;

a detection unit arranged in correspondence of an entrance of said natural leather into said cutting device, said detection unit being configured to detect a position of said natural leather, a shape of at least one end edge of said natural leather, and a position of any defects of said natural leather in proximity to said at least one end edge;

a plurality of conveyor belts configured, respectively, to move said natural leather from said ironing device towards said detection unit, present and subsequently move said natural leather away from said detection unit to/from said cutting device;

a first command and control unit configured to determine cutting coordinates of the natural leather based on said position of said natural leather, of said shape of said at least one end edge, and of said position of any defects, wherein said cutting coordinates define said at least one cutting line;

wherein said cutting device comprises at least one laser source, and at least one conveyor belt of said plurality of conveyor belts includes a conveying surface made with a metal mesh to prevent a laser beam emitted by said at least one laser source from rebounding on said natural leather;

a shielding container inside of which is positioned said at least one laser source;

wherein said ironing device comprises at least one pair of rollers counterfaced with each other, wherein said natural leather passes between said at least one pair of rollers to retain said natural leather;

wherein said ironing device also comprises a first movable arm configured for lifting/lowering said natural leather entering said at least one pair of rollers.

2. The trimming machine according to claim 1, wherein said at least one pair of rollers is motor-driven to rotate with respect to a relative axis and facilitate the ironing of said natural leather.

3. The trimming machine according to claim 2, wherein said at least one pair of rollers translate along a direction of moving towards/away from said detection unit.

4. The trimming machine according to claim 3, wherein said detection unit comprises at least one video camera, wherein said at least one video camera is one selected between a linear video camera, a matrix video camera or a combination thereof.

5. The trimming machine according to claim 4, wherein said detection unit comprises at least a first light source configured to illuminate a first surface of said natural leather, and a second light source configured to illuminate a second surface of said natural leather, to detect a thickness of said natural leather in the proximity of said at least one end edge, wherein said first and second surfaces are opposite each other.

6. The trimming machine according to claim 1, wherein said detection unit comprises at least one video camera, wherein said at least one video camera is one selected between a linear video camera, a matrix video camera or a combination thereof.

7. The trimming machine according to claim 6, wherein said detection unit comprises at least a first light source configured to illuminate a first surface of said natural leather, and a second light source configured to illuminate a second surface of said natural leather, to detect a thickness of said natural leather in the proximity of said at least one end edge, wherein said first and second surfaces are opposite each other.

8. The trimming machine according to claim 1, wherein said detection unit comprises at least a first light source configured to illuminate a first surface of said natural leather, and a second light source configured to illuminate a second surface of said natural leather, to detect a thickness of said natural leather in the proximity of said at least one end edge, wherein said first and second surfaces are opposite each other.

9. The trimming machine according to claim 1, wherein said at least one pair of rollers translate along a direction of moving towards/away from said detection unit.

10. A plant for conditioning natural leather, comprising:

the trimming machine according to claim 1;

a shaving machine of said natural leather arranged upstream of said trimming machine.

11. The plant according to claim 10, wherein the transfer of said natural leather from said shaving machine to an exit of said cutting device of said trimming machine takes place in a time of less than 10 minutes.

12. The plant according to claim 10, wherein said trimming machine comprises a thickness verification unit positioned at an exit of said cutting device for measuring a thickness of said natural leather in the proximity of said at least one end edge, wherein said thickness verification unit is configured to retroactively communicate with said trimming machine to automatically adjust a trimming thickness of said natural leather when the thickness of said natural leather detected by said thickness verification unit is above or below a predetermined threshold value.

13. A plant for conditioning natural leather, comprising:

a natural leather trimming machine comprising:

an ironing device for stretching and removing creases and wrinkles of said natural leather;

a cutting device arranged downstream of said ironing device, and configured to cut said natural leather along at least one cutting line;

a detection unit arranged in correspondence of an entrance of said natural leather into said cutting device, said detection unit being configured to detect a position of said natural leather, a shape of at least one end edge of said natural leather, and a position of any defects of said natural leather in proximity to said at least one end edge;

a plurality of conveyor belts configured, respectively, to move said natural leather from said ironing device towards said detection unit, present and subsequently move said natural leather away from said detection unit to/from said cutting device;

a first command and control unit configured to determine cutting coordinates of the natural leather based on said position of said natural leather, of said shape of said at least one end edge, and of said position of any defects, wherein said cutting coordinates define said at least one cutting line;

wherein said cutting device comprises at least one laser source, and at least one conveyor belt of said plurality of conveyor belts includes a conveying surface made with a metal mesh to prevent a laser beam emitted by said at least one laser source from rebounding on said natural leather;

a shielding container inside of which is positioned said at least one laser source;

a shaving machine of said natural leather arranged upstream of said trimming machine;

wherein said trimming machine comprises a thickness verification unit positioned at an exit of said cutting device for measuring a thickness of said natural leather in the proximity of said at least one end edge, wherein said thickness verification unit is configured to retroactively communicate with said trimming machine to automatically adjust a trimming thickness of said natural leather when the thickness of said natural leather detected by said thickness verification unit is above or below a predetermined threshold value.

14. The plant according to claim 13, wherein the transfer of said natural leather from said shaving machine to an exit of said cutting device of said trimming machine takes place in a time of less than 10 minutes.

* * * * *